March 11, 1947.  H. J. FRAMHEIN  2,417,395
PALLET TRUCK
Filed July 7, 1943  5 Sheets-Sheet 1

INVENTOR
H. J. Framhein
A. H. Golden
ATTORNEY

March 11, 1947. H. J. FRAMHEIN 2,417,395
PALLET TRUCK
Filed July 7, 1943 5 Sheets-Sheet 3

Fig. 4.

INVENTOR
H. J. Framhein
BY
A. H. Golden
ATTORNEY

Patented Mar. 11, 1947

2,417,395

UNITED STATES PATENT OFFICE 2,417,395

PALLET TRUCK

Herbert J. Framhein, Chicago, Ill., assignor to The Yale & Towne Manufacturing Company, Stamford, Conn., a corporation of Connecticut Application July 7, 1943, Serial No. 493,701

42 Claims. (Cl. 254—2)

This invention relates to industrial trucks of the type in which an elevating platform is adapted to be lifted relatively to a lifting head for the purpose of elevating a load carrying pallet or skid. More particularly, one phase of the invention of this application relates to the invention in my application for a pallet truck Serial No. 432,177 filed February 25, 1942, now Patent No. 2,399,596, dated April 30, 1946. In this earlier application I illustrate a pallet truck of the type known as a single frame truck; that is, a truck having a lifting head that is wheel supported and an elevating platform supported and lifted at its rear by lifting wheels preferably mounted on pivotal lifting links, the forward end of the elevating platform being mounted for lifting movement on the lifting head as the lifting wheels lift the rear end. In the truck of my application, cams are connected to the links carrying the rear lifting wheels, and as the forward end of the elevating platform is elevated, the cams are rotated to move the lifting links in a downward direction to lift the rear end of the elevating platform.

Also, in the said application, the elevating platform is shown mounted for vertical lifting movement relatively to the lifting head through means of rollers carried on the elevating platform riding in channels on the lifting head. The links that carry the rear lifting wheels are pivoted to cams that are moved by rollers as the elevating platform is raised, the cams being mounted on the lifting head and the rollers being carried on the forward end of the elevating platform. In a later application for a pallet truck Serial No. 481,957 filed April 6, 1943, I have improved on the structure of application Serial No. 432,177 in that the cams are mounted on the elevating platform and are actuated by rollers on the lifting head as the cams move with the elevating platform incidental to the upward movement of that platform.

The present application forms an improvement over the structures of the said earlier applications insofar as it contributes what I consider a better means for actuating the links carrying the lifting wheels at the rear end of the platform. My invention forms also an important contribution over those single frame trucks in which the links connecting the elevating platform and lifting head are used to move the rear wheel lifting links. A feature of my invention resides in the use of non-rigid means connecting the lifting wheel links to the lifting head, and with the feature that these non-rigid means are deformed and thus actuated as the elevating platform is lifted, whereby to rotate the links and the wheels carried thereby to lift the rear end of the elevating platform. As a further feature of the invention, it is the platform that carries the means for moving the non-rigid means connecting the lifting wheel links and the lifting head.

As a more detailed feature of this part of my invention, the lifting wheel links and lifting head are connected by what may be termed rods pivoted to one another and to the lifting head and lifting wheel links, with means being provided for moving the rods as the elevating platform is lifted so as to rotate the lifting wheel links to lift the rear end of the elevating platform. As a still further detailed feature of my invention the rods are so moved by means, preferably in the form of a rod, pivoted to the elevating platform and movable therewith.

As a further feature of my invention the forward end of the elevating platform is pivoted through links to the lifting head so that the elevating platform will move in a pivotal manner relatively to the lifting head thereby making it possible to employ most effectively the means I have conceived for actuating the rear lifting wheel links.

A further feature of my invention relates to a truck of the type illustrated in my earlier applications Serial No. 458,035 filed Sept. 11, 1942, and 469,324 filed Dec. 17, 1942. In the said applications there is disclosed a truck in which the rear lifting wheels are maintained in an upward position and off the ground when the elevating platform is in its fully lowered position. Because of this arrangement of the parts, the elevating platform may readily be moved into a position between the upper and lower floors of a pallet without requiring the lifting wheels to bump up and down relatively to the floor boards of the pallet as was necessary prior to my invention. Also, in the said applications the truck is supported for movement by its forward steering wheel mounted under the lifting head, and by what I term intermediate wheels, it being a feature of the invention of the said applications that when the lifting wheels of the truck move downwardly to lift the rear end of the elevating platform, the intermediate wheels are preferably elevated off the ground incidental to the lifting of the forward end of the elevating platform. In the earlier of said applications the intermediate wheels are carried on the lifting head while in the latter application the intermediate wheels are on the elevating platform.

The present application discloses a truck of the retracted lifting wheel and intermediate wheel type such as disclosed in the said two applications, with novel operating means for the lifting wheels at the rear of the platform. It is a feature of this phase of my invention that the lifting wheels are maintained in an upward position by the means that actuate the wheels. As a further feature of the invention, the whels are positively held upwardly rather than through springs as in my earlier applications.

As a modification of my invention I substitute for the rods connected between the lifting head and the rear wheel lifting links a cable that may be pulled upon by a roller or other means carried by the elevating platform, thereby moving the lifting wheels downwardly relatively to the elevating platform as the forward end of the elevating platform is lifted. In this modification retracting lifting wheels are shown as a further feature of the invention.

I have thus described the more important features of my invention in order that my contribution to the art may be better understood and in order that the relation of my contribution to the prior art may be better comprehended. I do believe that my contribution is a broad and valuable one and that I am entitled to patent claims that will prevent newcomers in the field from utilizing my contribution to the art with such variations in physical structure as will readily occur to those skilled in the art. Also, while I have described generally several important features of my invention, there are other important features that will be described particularly in the specification and will be claimed in the claims appended hereto.

Referring now to the drawings

Figure 1:
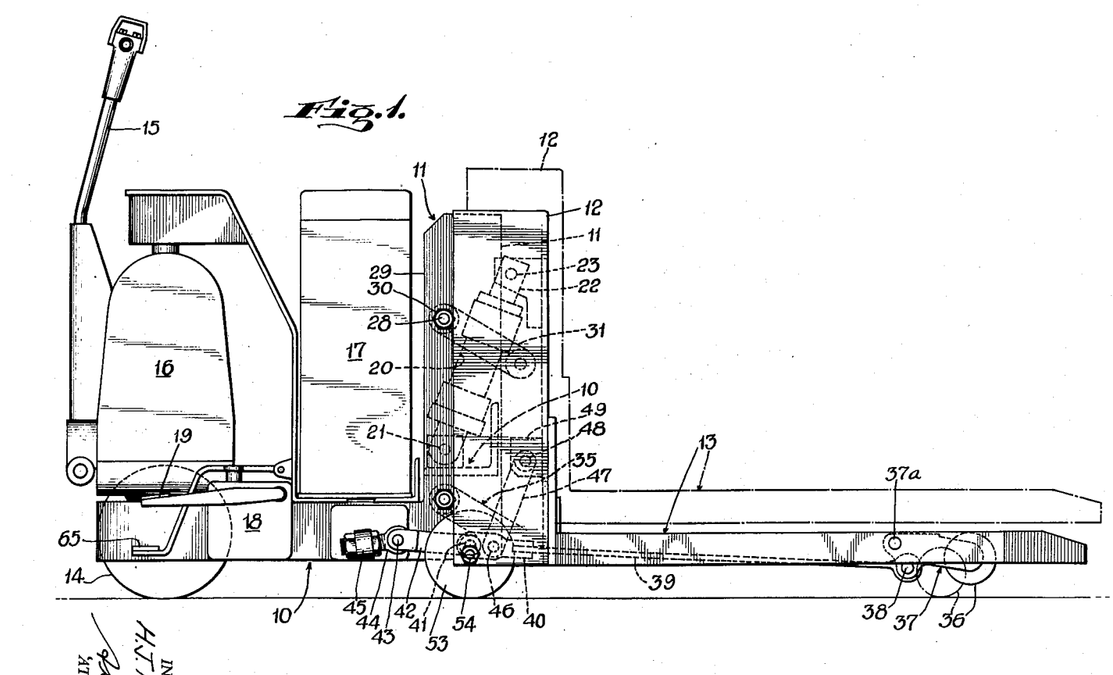
Fig. 1 is a vertical side view of a truck embodying my invention.
Figures 2, 3:
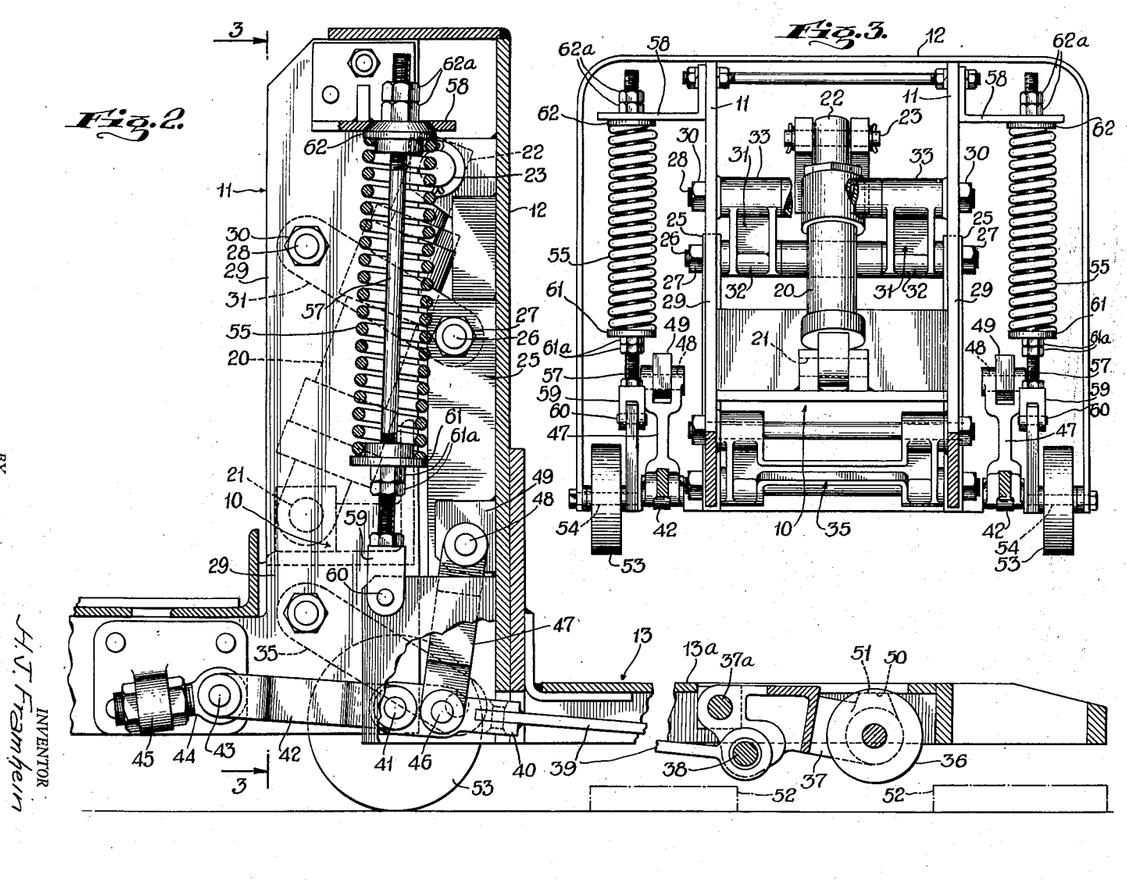
Fig. 2 is a partial vertical section of a portion of the truck of Fig. 1.
Fig. 3 is a partial section taken along lines 3—3 of Fig. 2.

Referring now more particularly to the drawings and especially Figs. 1 and 2, I illustrate a motorized truck of the type shown in my application Serial No. 390,931 filed April 29, 1941, now Patent No. 2,327,583, dated August 24, 1943, to which my invention may be applied. In the drawings the lifting head is designated generally by reference numeral 10 and is formed with a vertical standard 11 which is adapted to be assembled to the vertical standard 12 of the elevating platform 13 by means to be described hereinafter. The lifting head carries a steering head including a steering wheel 14 that is steered by a steering lever 15 all as will be understood by those skilled in the art. As indicated, the particular truck described is motorized and utilizes a power unit 16 for driving the steering wheel 14, power being derived from a battery 17.

At 18 there is illustrated a pump that is actuated by a foot treadle 19 to apply hydraulic pressure to a hydraulic lifting mechanism 20. This hydraulic lifting mechanism has the lower end of its cylinder portion pivoted at 21 to the lifting head 10, while its ram 22 is pivoted at 23 to the standard 12 of the elevating platform 13. The mounting and actuation of the hydraulic lifting mechanism 20 is more or less the same as that illustrated in my earlier applications and it is not thought that any additional description will be required by the examiner, since a mere reference to the drawings of this application and the drawings and descriptive matter of my earlier applications will disclose fully the operation of the parts referred to.

Figure 4:
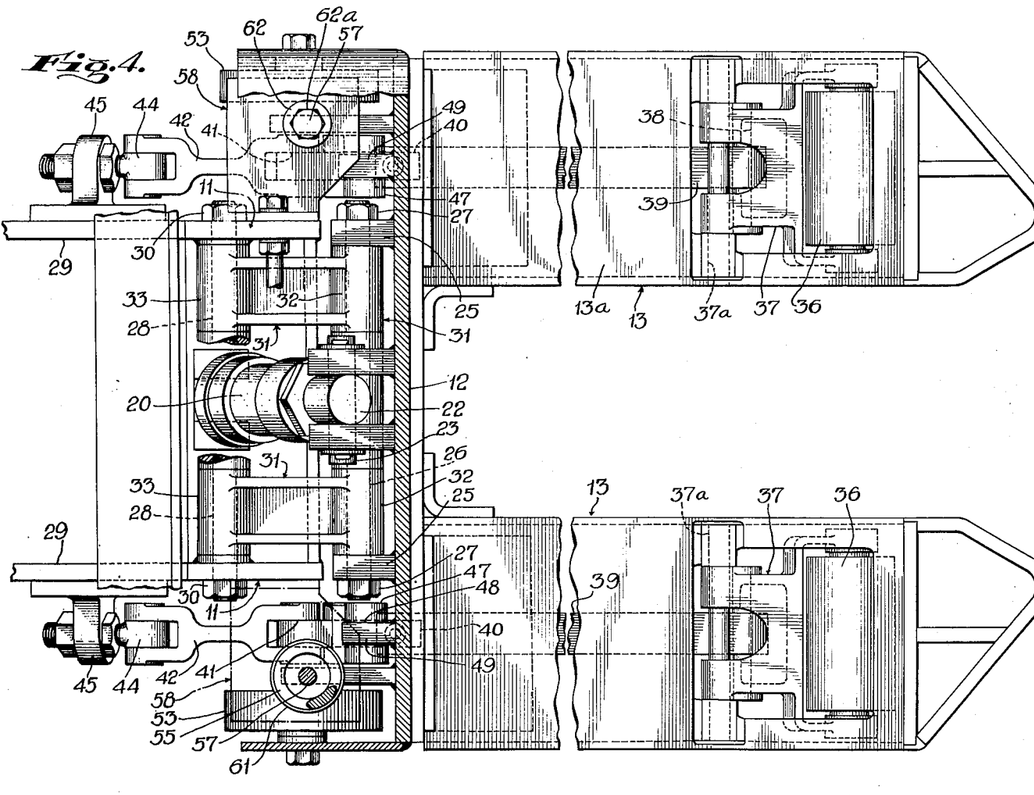
Fig. 4 is a partial section and plan view of the truck of Fig. 1.

As is probably best seen in Fig. 4, lugs 25 are welded to the upper part of the standard 12 of the elevating platform and a rod 26 is secured transversely between the lugs, being held in position by suitable nuts 27 threaded on to the ends of the rod 26. A rod 28 similar to the rod 26 is supported between the side plates 29 forming the standard 11 of the lifting head and is held in position by suitable nuts 30, all as will be quite clear to those skilled in the art. A link designated generally by reference numeral 31 is formed with sleeve portions 32 fitting about the rod 26 and additional sleeve portions 33 fitted about the rod 28.

Figure 5:
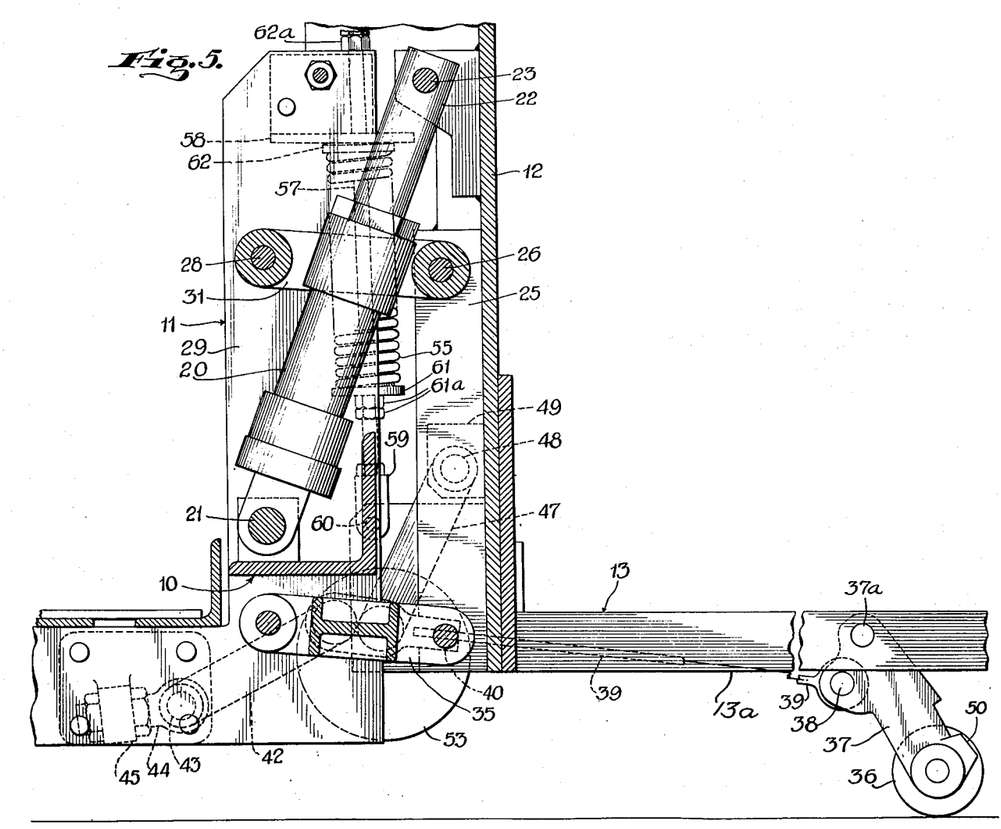
Fig. 5 is a view similar to Fig. 2 of the parts of the truck in a further position thereof.

The lower portions of the lifting head standard 11 and elevating platform standard 12 are similarly connected through rods by a link designated generally by reference numeral 35, and best illustrated in Fig. 3. It is quite obvious to those skilled in the art that when the ram 22 of the hydraulic lifting mechanism 20 is extended, the elevating platform standard 12 will move upwardly relatively to lifting head standard 11 through links 31 and 35 from the position of Figs. 1 and 2 to the position of Fig. 5, thus elevating the forward end of the platform 13. It is obvious moreover, that because of the initial arrangement of the links 31 and 35, the elevating platform will move somewhat rearwardly and upwardly relatively to the lifting head. This motion is quite valuable for the best operation of my invention as will be made apparent hereinafter, but it should be understood that my invention may be employed with other arrangements of the links, and that certain parts of my invention will be of great value independently of the mounting of the elevating platform relatively to the lifting head.

The particular truck illustrated in this specification is of the U-platform type as shown in Fig. 4, and I shall describe the lifting means of one leg of the U-platform, it being understood that the construction of each side of the truck and of each leg of the platform is the same. The rear lifting wheels of the truck are designated by reference numeral 36, there being one for each of the legs 13a of the U-platform 13, and each wheel 36 is carried in a rear wheel lifting link 37 that is pivoted at 37a to the U-leg 13a. In the modification of Figs. 1–5 inclusive, the rear wheel lifting link 37 has pivotally connected thereto at 38 a member 39 that I herein term a rod. This rod 39 is secured to a trunnion 40 that is pivoted at 41 to what I call a forward rod 42. This forward rod 42 is in turn pivoted at 43 to an eye 44 that is adjustably secured on a bracket 45 forming an integral part of the lifting head 10.

The trunnion 40 has pivoted thereto at 46 a member 47 that I call a connecting rod, and that is in turn pivoted at 48 to a bracket 49 of the elevating platform. When the elevating platform is in its lowered position of Figs. 1 and 2, it will be noted that each rear lifting wheel link 37 is elevating until its lug 50 encounters a surface 51 of the leg 13a, the wheel 36 then being raised substantially from the floor on which the truck is carried so that the floor boards 52 of a pallet will not interfere with the movement of the truck as is well illustrated in Fig. 2. It will be noted that the lifting wheel links 37 are held in their elevated position by the series of rods 39, 42, 47 constituting the actuating means for the said links, rather than through springs as in my earlier applications.

The elevating platform is adapted to be supported by a pair of intermediate wheels 53 when the lifting wheels 36 are raised from the ground as in Fig. 2, there being a wheel at each side of the truck. Thus, the wheels 53 together with the forward steering wheel 14 support the truck for movement on a short wheelbase into any desired position, with the lifting wheels 36 raised out of position so as not to interfere with the movement of the truck, all as is apparent from Fig. 1. For this purpose each wheel 53 is mounted about a short shaft 54 carried by the elevating platform as is probably best seen in Fig. 3.

For maintaining the intermediate wheels against the ground in the position of Figs. 1 and 2, and thus maintaining the lifting wheels 36 upwardly pressed, springs 55 are utilized, there being one spring at each side of the truck. These springs are mounted about rods 57 extending upwardly through brackets 58 of the lifting head standard 11. The lower end of each rod 57 is secured to a bifurcated trunnion 59 that is pivoted at 60 to the elevating platform 13. Each spring 55 is confined on its rod 57 between a lower pressure plate 61 and an upper pressure plate 62. Each lower pressure plate 61 is held in an adjusted position on its rod 57 by a pair of nuts 61a while each upper pressure plate 62 presses against the bracket 58 of the lifting head standard 11. Nuts 62a are on the upper ends of the rods 57 and hold the upper pressure plate in its proper relation. The pressure plate 62 is free for limited pivotal movement with rod 57 relatively to bracket 58. It is thus readily perceived that the springs 55 will function to press the rods 57 downwardly and thereby to press the forward end of the elevating platform downwardly relatively to the lifting head. This pressure of the springs 55 will act to maintain the intermediate wheels 53 against the ground so that the truck may be moved on the said wheels 53 and the front steering end traction wheel 14.

When the elevating platform is maintained in its position of Figs. 1 and 2 by the springs 55, the rods 47 will function through the rods 42 and 39 to maintain the lifting wheels 36 in the position of Figs. 1 and 2 and off the ground, all as will be readily appreciated.

When the treadle 19 of the pump 18 is operated to move the ram 22 of the hydraulic lifting mechanism upwardly and outwardly of the cylinder 20, the elevating platform will move upwardly relatively to the lifting head on the upper link 31 and the lower link 35. This movement of the elevating platform will, through the rods 47, and the rods 42 and 39, move the rear wheel lifting links 37 downwardly from the full line position of Fig. 1, and the position of Fig. 2, against the ground. This movement will be quite swift and will take place during but a very short movement of the elevating platform. Thereafter, continued operation of the lifting mechanism will effect the upward movement of the elevating platform at its forward end to the position of Fig. 5. At the same time, the lifting wheels 36 will be moved downwardly into the position of Fig. 5 to effect the simultaneous upward movement of the rear of the elevating platform 13.

If it now be desired to lower the elevating platform back to its position of Figs. 1 and 2, the operator will press the release treadle 65 (Fig. 1) and that treadle will open valve mechanism in the hydraulic lifting mechanism to allow a downward movement of the ram 22, all in a manner that is well known in the prior art. The elevating platform will now be lowered under the control of the hydraulic ram and under the influence of the load and springs 55. The lowering movement of the elevating platform will continue until the intermediate wheels 53 contact the ground and the lifting wheels 36 are moved upwardly into their position of Fig. 2 through the operation of the rods 39, 42 and 47.

It will be well to indicate that because of the relationship of the several parts, the lifting links 31 and 35 are relieved of all stresses incidental to the operation of the lifting wheels 36, thereby contributing a very smooth and efficient lifting of the elevating platform. In those prior art structures such as shown in the Quayle Patent No. 2,274,164 of Feb. 24, 1942, in which elevating platforms are mounted on links similar to my links 31 and 35, and in which lifting wheels are utilized for elevating the rear end of the platform, it is the links 31 and 35 that are employed to move the lifting wheels. My invention contributes a considerable improvement over such prior art structures as outlined.

Figure 6:
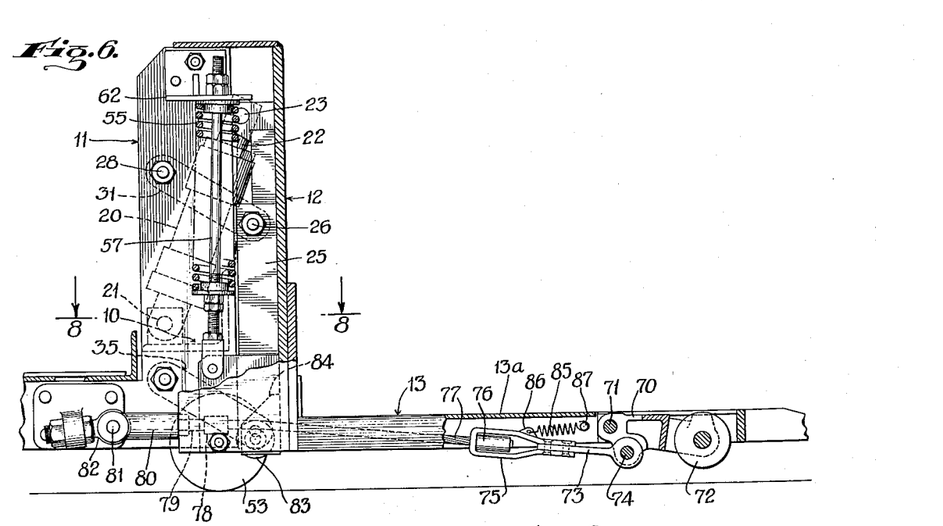
Fig. 6 is a view similar to Fig. 2 but illustrating the modification of my truck in which a cable is employed.
Figures 7, 8:
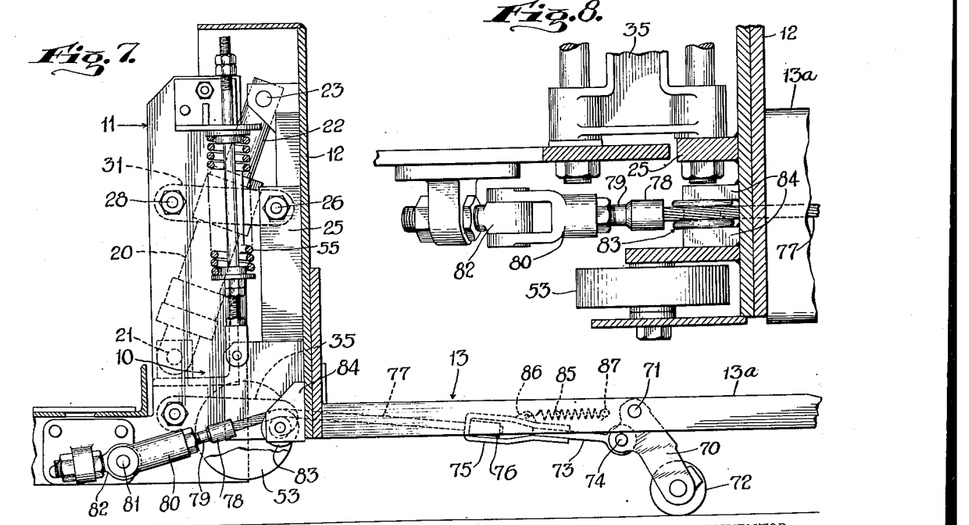
Fig. 7 is a view similar to Fig. 6 but illustrating the rear wheel lifting links in a downward lifting position.
Fig. 8 is a view taken along lines 8—8 of Fig. 6.

In Figs. 6, 7 and 8 I show a modified form of my invention in which a cable is substituted for rods 39 and 42 of the modification of Fig. 1. For operating the said cable to move the rear wheel lifting links, a roller is mounted on the elevating platform. Referring now particularly to Figs. 6, 7 and 8, it will be noted that the rear wheel lifting links for each leg 13a of the elevating platform 13 is designated by reference numeral 70. This rear wheel lifting link is pivoted at 71 on the leg 13a and carries a lifting wheel 72. A rod 73 is pivoted at 74 to the rear wheel lifting link 70 and is formed with an eye 75 into which passes an enlarged head 76 secured to a cable 77. The other end of this cable 77 is secured to a head 78 carried on a rod 79 that is threaded to facilitate the securing thereof to a trunnion 80 pivoted at 81 to a part 82 adjustably secured to the lifting head in a manner that was described in connection with the first modification. The cable 77 passes over a roller 83 that is mounted for rotation on bearing plates 84 of the elevating platform. The remainder of the truck structure is the same as that described with regard to the first modification of this application.

It is now quite apparent that as the front end of the elevating platform is raised from the position of Fig. 6 to the position of Fig. 7, the roller 83 will pull on the cable 77 moving it from its position of Fig. 6 to its position of Fig. 7. This will effect the pivoting of the rear wheel lifting links 70 so as to move the wheels 72 into their lifting position of Fig. 7 to elevate the platform of the truck. When the elevating platform is lowered, the cable will be allowed to move so that the wheels 72 may move toward their position of Fig. 6. The wheels 72 are urged into their final position of Fig. 6 by auxiliary springs 85 that are connected at 86 to the members 75 and at 87 to the U-legs 13a of the elevating platform.

I believe that the construction and operation of my invention will now be apparent to those skilled in the art.

I now claim:

1. In a truck of the class described, a wheel supported lifting head having a vertical standard, an elevating platform having a forward vertical standard, parallel links pivotally connecting said standards and whereby said platform is movable upwardly on said links relatively to said lifting head, lifting means extending between said standards for lifting the forward end of said elevating platform relatively to said lifting head, intermediate wheels carried by the forward end of said elevating platform and positioned against the ground when said elevating platform is in its lowered position, and off the ground when said elevating platform is lifted relatively to said lifting head, wheel supporting links pivoted to the rear end of said elevating platform, lifting wheels rotatably mounted on said links, and means for rotating said links to lower said wheels as the front end of the elevating platform is lifted whereby to lift also the rear end of said platform.

2. In a truck of the class described, a lifting head, an elevating platform, support wheels for said truck, means mounting said elevating platform for lifting movement relatively to said lifting head, lifting means for lifting said elevating platform relatively to said lifting head, lifting wheels movably mounted under the rear of said elevating platform, positive means for moving said lifting wheels downwardly as the said platform is lifted by said lifting means whereby to lift also the rear of said truck, and said same positive means moving said lifting wheels upwardly away from the ground with the lowermost portions of the peripheries thereof above the plane of corresponding portions of said support wheels when said elevating platform is moved to its fully lowered position.

3. In a truck of the class described, a wheel supported lifting head, an elevating platform, means mounting said elevating platform for lifting movement relatively to said lifting head, lifting means for lifting said elevating platform relatively to said lifting head, intermediate wheels mounted for rotation on said elevating platform and positioned against the ground when said elevating platform is in its lowered position relatively to said lifting head, and off the ground when the elevating platform is lifted relatively to said lifting head, lifting wheels movably mounted under the rear of said elevating platform, positive means for moving said lifting wheels downwardly as the said platform is lifted by said lifting means whereby to lift also the rear of said truck, and said same positive means moving said lifting wheels upwardly away from the ground with the lowermost portions of the peripheries thereof above the plane of corresponding portions of said intermediate wheels when said elevating platform is moved to its fully lowered position.

4. In a truck of the class described, a lifting head, an elevating platform, support wheels for said truck, means pivotally mounting said platform for pivotal lifting movement relatively to said lifting head, lifting means for lifting said elevating platform relatively to said lifting head on said mounting means, lifting wheels for the rear of said elevating platform, wheel carrying means for supporting said lifting wheels and movably mounted under the rear of said elevating platform for lifting the rear of said platform when moved downwardly relatively thereto, means whereby when said elevating platform is lowered relatively to said lifting head said wheel carrying means are maintained in a position with said lifting wheels off the ground and with the lowermost portions of the peripheries thereof above the plane of corresponding portions of said support wheels, and means whereby the operation of said lifting means effects the movement of said wheel carrying means to lower the said lifting wheels against the ground and to lift the rear of said platform.

5. In a truck of the class described, a lifting head, an elevating platform, means pivotally mounting said platform for pivotal lifting movement relatively to said lifting head, lifting means for lifting said elevating platform relatively to said lifting head on said mounting means, intermediate wheels mounted on said elevating platform and positioned against the ground when said elevating platform is in its lowered position relatively to said lifting head, and off the ground when said elevating platform is lifted relatively to said lifting head, lifting wheels for the rear of said elevating platform, wheel carrying means for supporting said lifting wheels and movably mounted under the rear of said elevating platform for lifting the rear of said platform when moved downwardly relatively thereto, means whereby when said elevating platform is lowered relatively to said lifting head said wheel carrying means are maintained in a position with said lifting wheels off the ground and with the lowermost portions of the peripheries thereof above the plane of corresponding portions of said intermediate wheels, and means whereby the operation of said lifting means effects the movement of said wheel carrying means to lower the said lifting wheels against the ground and to lift the rear of said platform.

6. In a truck of the class described, a wheel supported lifting head, an elevating platform, means pivotally mounting said platform for pivotal lifting movement relatively to said lifting head, lifting means for lifting said elevating platform relatively to said lifting head on said mounting means, intermediate wheels mounted on said elevating platform and positioned against the ground when said elevating platform is in its lowered position relatively to said lifting head, and off the ground when said elevating platform is lifted relatively to said lifting head, lifting wheels for the rear of said elevating platform, wheel carrying means for supporting said lifting wheels and movably mounted under the rear of said elevating platform for lifting the rear of said platform when moved downwardy relatively to said lifting head, means whereby when said elevating platform is lowered relatively to said lifting head said wheel carrying means are maintained in a position with said lifting wheels off the ground and with the lowermost portions of the peripheries thereof above the plane of corresponding portions of said intermediate wheels, and means whereby the operation of said lifting means effects the movement of said wheel carrying means to lower the said lifting wheels against the ground and to lift the rear of said platform.

7. In a truck of the class described, a lifting head, an elevating platform, means pivotally mounting said platform for pivotal lifting movement relatively to said lifting head, lifting means for applying lifting effort directly to said elevating platform for lifting said platform relatively to said lifting head on said mounting means, intermediate wheels mounted on said elevating platform and positioned against the ground when said elevating platform is in its lowered position relatively to said lifting head, and off the ground when said elevating platform is lifted relatively to said lifting head, lifting wheels for the rear of said elevating platform, wheel carrying means for supporting said lifting wheels and movably mounted under the rear of said elevating platform for lifting the rear of said platform when moved downwardly relatively thereto, means whereby when said elevating platform is lowered relatively to said lifting head said wheel carrying means are maintained in a position with said lifting wheels off the ground and with the lowermost portions of the peripheries thereof above the plane of corresponding portions of said intermediate wheels, and means whereby the operation of said lifting means to lift said platform effects the movement of said wheel carrying means to lower the said lifting wheels against the ground and to lift the rear of said platform.

8. In a truck of the class described, a wheel supported lifting head, an elevating platform, means pivotally mounting said platform for pivotal lifting movement relatively to said lifting head, lifting means for lifting said elevating platform relatively to said lifting head on said mounting means, intermediate wheels mounted on said elevating platform and positioned against the ground when said elevating platform is in its lowered position relatively to said lifting head, and off the ground when said elevating platform is lifted relatively to said lifting head, lifting wheels for the rear of said elevating platform, wheel carrying means for supporting said lifting wheels and movably mounted under the rear of said elevating platform for lifting the rear of said platform when moved downwardly relatively to said lifting head, means whereby when said elevating platform is lowered relatively to said lifting head said wheel carrying means are maintained in a position with said lifting wheels off the ground and with the lowermost portions of the peripheries thereof above the plane of corresponding portions of said intermediate wheels, and means whereby the lifting movement of said elevating platform on said mounting means effects the movement of said wheel carrying means to lower the said lifting wheels against the ground and to lift the rear of said platform.

9. In a truck of the class described, a lifting head, an elevating platform, means pivotally mounting said platform for pivotal lifting movement relatively to said lifting head, lifting means for lifting said elevating platform relatively to said lifting head on said mounting means, intermediate wheels mounted on said elevating platform and positioned against the ground when said elevating platform is in its lowered position relatively to said lifting head, and off the ground when said elevating platform is lifted relatively to said lifting head, spring means pressing said elevating platform downwardly relatively to said lifting head, lifting wheels for the rear end of said elevating platform, wheel carrying means for supporting said lifting wheels and movably mounted under the rear of said elevating platform for lifting the rear of said platform when moved downwardly relatively thereto, means whereby when said elevating platform is lowered relatively to said lifting head said wheel carrying means are maintained in a position with said lifting wheels off the ground and with the lowermost portions of the peripheries thereof above the plane of corresponding portions of said intermediate wheels, and means whereby the operation of said lifting means effects the movement of said wheel carrying means to lower the said lifting wheels against the ground and to lift the rear of said platform.

10. In a truck of the class described, a wheel supported lifting head, an elevating platform, upper and lower parallel links pivotally mounting the front end of said elevating platform for lifting movement relatively to said lifting head, lifting means for lifting the forward end of said elevating platform relatively to said lifting head, intermediate wheels mounted for rotation on said elevating platform and positioned against the ground when said elevating platform is in its lowered position relatively to said lifting head, a spring for pressing said elevating platform into said lowered position, wheel supporting links pivoted to the rear end of said elevating platform, lifting wheels rotatably mounted on said links, means for rotating said links to lower said wheels as the front end of the elevating platform is lifted whereby to lift also the rear end of said platform, said means holding said links with said lifting wheels spaced from the ground and with the lowermost portions of the peripheries thereof above the plane of corresponding portions of said intermediate wheels when said elevating platform is in its lowered position and with said intermediate wheels on the ground.

11. In a truck of the class described, a wheel supported lifting head, an elevating platform, upper and lower parallel links pivotally mounting the front end of said elevating platform for lifting movement relatively to said lifting head, lifting means for lifting the forward end of said elevating platform relatively to said lifting head, intermediate wheels mounted for rotation on said elevating platform and positioned against the ground when said elevating platform is in its lowered position relatively to said lifting head, a spring for pressing said elevating platform into said lowered position, wheel supporting links pivoted to the rear end of said elevating platform, lifting wheels rotatably mounted on said links, means for rotating said links to lower said wheels as the front end of the elevating platform is lifted whereby to lift also the rear end of said platform, and said means holding said links with said lifting wheels spaced from the ground and with the lowermost portions of the peripheries thereof above the plane of corresponding portions of said intermediate wheels when said elevating platform is in its lowered position and with said intermediate wheels on the ground.

12. In a truck of the class described, a wheel supported lifting head, an elevating platform, support wheels for said truck, means mounting the forward end of said platform for lifting movement relatively to said lifting head, lifting wheels movably mounted under the rear of said elevating platform and adapted when moved to lift the rear of said platform, lifting means for lifting said platform relatively to said lifting head, a flexible connector secured at one end to said lifting head and at its other end relatively to said lifting wheels, means adapted to pull on said flexible connector as said lifting means effects the lifting of said platform relatively to said lifting head whereby to move said lifting wheels to lift the rear end of said platform, and spring means for holding said lifting wheels upwardly off the ground with the lowermost portions of the peripheries thereof above the plane of corresponding portions of said support wheels when said elevating platform is lowered relatively to said lifting head.

13. In a truck of the class described, a wheel supported lifting head, an elevating platform, support wheels for said truck, means mounting the forward end of said platform for lifting movement relatively to said lifting head, lifting wheels movably mounted under the rear of said elevating platform and adapted when moved to lift the rear of said platform, lifting means for lifting said platform relatively to said lifting head, a flexible connector secured at one end to said lifting head and at its other end relatively to said lifting wheels, means adapted to pull on said flexible connector as said lifting means effects the lifting of said platform relatively to said lifting head whereby to move said lifting wheels to lift the rear end of said platform, and means for holding said lifting wheels upwardly off the ground with the lowermost portions of the peripheries thereof above the plane of corresponding portions of said support wheels when said elevating platform is lowered relatively to said lifting head.

14. In a truck of the class described, a wheel supported lifting head, an elevating platform, support wheels for said truck, means mounting the forward end of said platform for lifting movement relatively to said lifting head, lifting wheels movably mounted under the rear of said elevating platform and adapted when moved to lift the rear of said platform, lifting means for lifting said platform relatively to said lifting head, a flexible connector secured to said lifting wheels, means adapted to pull on said flexible connector as said lifting means effects the lifting of said platform relatively to said lifting head whereby to move said lifting wheels to lift the rear end of said platform, and means for holding said lifting wheels upwardly off the ground with the lowermost portions of the peripheries thereof above the plane of corresponding portions of said support wheels when said elevating platform is lowered relatively to said lifting head.

15. In a truck of the class described, a wheel supported lifting head, an elevating platform, support wheels for said truck, means mounting the forward end of said platform for lifting movement relatively to said lifting head, lifting wheels movably mounted under the rear of said elevating platform and adapted when moved to lift the rear of said platform, lifting means for lifting the forward end of said platform relatively to said lifting head, a leverage system including a lever pivoted to said lifting head, a second lever pivoted to said lifting wheel mounting and pivotally connected to said first lever, and means secured to said elevating platform for actuating said leverage system as the forward end of said platform is lifted whereby to move said lifting wheels to lift the rear end of the platform, said leverage system holding said lifting wheels upwardly off the ground with the lowermost portions of the peripheries thereof above the plane of corresponding portions of said support wheels when said platform is lowered relatively to said lifting head.

16. In a truck of the class described, a wheel supported lifting head, an elevating platform, means mounting the forward end of said platform for lifting movement relatively to said lifting head, lifting wheels movably mounted under the rear of said elevating platform and adapted when moved to lift the rear of said platform, lifting means for lifting the forward end of said platform relatively to said lifting head, a leverage system interconnecting said lifting head, said elevating platform and said lifting wheels and movable as the forward end of said platform is lifted whereby to move said lifting wheels to lift the rear end of the platform, intermediate wheels on said elevating platform for contacting the ground when said elevating platform is lowered, and said leverage system holding said lifting wheels upwardly off the ground with the lowermost portions of the peripheries thereof above the plane of corresponding portions of said intermediate wheels when said platform is lowered relatively to said lifting head.

17. In a truck of the class described, a wheel supported lifting head, an elevating platform, means mounting the forward end of said platform for lifting movement relatively to said lifting head, lifting wheels movably mounted under the rear of said elevating platform and adapted when moved to lift the rear of said platform, lifting means for lifting the forward end of said platform relatively to said lifting head, a rod pivoted to said lifting head, a second rod pivoted to said lifting wheels, means pivotally connecting said rods, and means adapted to move said rods on their pivots as the forward end of said platform is lifted whereby to move said lifting wheels to lift the rear of the platform, intermediate wheels for supporting said truck on the ground when said elevating platform is lowered, and said rods holding said lifting wheels upwardly off the ground with the lowermost portions of the peripheries thereof above the plane of corresponding portions of said intermediate wheels when said platform is lowered relatively to said lifting head.

18. In a truck of the class described, a wheel supported lifting head, an elevating platform, links pivotally mounting the forward end of said platform for lifting movement relatively to said lifting head, lifting wheels movably mounted under the rear end of said elevating platform and adapted when moved to lift the rear end of said platform, intermediate wheels on said elevating platform adapted to contact the ground when said elevating platform is lowered relatively to said lifting head, lifting means for lifting the forward end of said platform relatively to said lifting head, a leverage system interconnecting said lifting head, said elevating platform and said lifting wheels and movable as the forward end of said platform is lifted whereby to move said lifting wheels to lift the rear end of the platform, said leverage system holding said lifting wheels upwardly off the ground with the lowermost portions of the peripheries thereof above the plane of corresponding portions of said intermediate wheels when said platform is lowered relatively to said lifting head.

19. In a truck of the class described, a wheel supported lifting head, an elevating platform, links pivotally mounting the forward end of said platform for lifting movement relatively to said lifting head, lifting wheels movably mounted under the rear end of said elevating platform and adapted when moved to lift the rear end of said platform, intermediate wheels on said elevating platform for contacting the ground when said elevating platform is lowered relatively to said lifting head, lifting means for lifting the forward end of said platform relatively to said lifting head, a leverage system interconnecting said lifting head, said elevating platform and said lifting wheels and movable as the forward end of said platform is lifted whereby to move said lifting wheels to lift the rear end of the platform, said leverage system holding said lifting wheels upwardly off the ground with the lowermost portions of the peripheries thereof above the plane of corresponding portions of said intermediate wheels when said platform is lowered relatively to said lifting head, and springs pressing said elevating platform downwardly relatively to said lifting head.

20. In a truck of the class described, a wheel supported lifting head, an elevating platform, means mounting the forward end of said platform for lifting movement relatively to said lifting head, support wheels for said truck, lifting wheels movably mounted under the rear end of said elevating platform and adapted when moved to lift the rear end of said platform, lifting means for lifting the forward end of said platform relatively to said lifting head, a rod pivoted to said lifting head, a second rod pivoted to said lifting wheels, means pivotally connecting said rods, and means on said elevating platform adapted to move said rods on their pivots as the forward end of said platform is lifted whereby to move said lifting wheels to lift the rear end of the platform, said rods holding said lifting wheels upwardly off the ground with the lowermost portions of the peripheries thereof above the plane of corresponding portions of said support wheels when said platform is lowered relatively to said lifting head.

21. In a truck of the class described, a wheel supported lifting head, an elevating platform, means mounting the forward end of said platform for lifting movement relatively to said lifting head, lifting wheels movably mounted under the rear end of said elevating platform and adapted when moved to lift the rear end of said platform, lifting means for lifting the forward end of said platform relatively to said lifting head, a rod pivoted to said lifting head, a second rod pivoted to said lifting wheels, means pivotally connecting said rods, means on said elevating platform adapted to move said rods on their pivots as the forward end of said platform is lifted whereby to move said lifting wheels to lift the rear end of the platform, springs pressing said elevating platform downwardly relatively to said lifting head, and intermediate wheels on said elevating platform for contacting the ground when said elevating platform is lowered.

22. In a truck of the class described, a wheel supported lifting head, an elevating platform, means mounting the forward end of said platform for lifting movement relatively to said lifting head, lifting wheels movably mounted under the rear of said elevating platform and adapted when moved to lift the rear of said platform, intermediate wheels on said elevating platform adapted to contact the ground when said elevating platform is lowered relatively to said lifting head, lifting means for lifting the forward end of said platform relatively to said lifting head, a rod pivoted at one end to said lifting head and at its other end relatively to one end of a second rod, means pivoting the other end of said second rod relatively to said lifting wheels, and means secured to said elevating platform for pivotally moving said rods relatively to each other and the lifting head and elevating platform as the front end of said elevating platform is lifted whereby to move said lifting wheels to lift the rear end of the elevating platform, and said means through said rods holding said lifting wheels upwardly off the ground with the lowermost portions of the peripheries thereof above the plane of corresponding portions of said intermediate wheels when said platform is lowered relatively to said lifting head.

23. In a truck of the class described, a wheel supported lifting head, an elevating platform, means mounting the forward end of said platform for lifting movement relatively to said lifting head, lifting wheels movably mounted under the rear of said elevating platform and adapted when moved to lift the rear of said platform, lifting means for lifting the forward end of said platform relatively to said lifting head, a rod pivoted at one end to said lifting head and at its other end relatively to one end of a second rod, means pivoting the other end of said second rod relatively to said lifting wheels, means secured to said elevating platform for pivotally moving said rods relatively to each other and the lifting head and elevating platform as the front end of said elevating platform is lifted whereby to move said lifting wheels to lift the rear end of the elevating platform, springs pressing said elevating platform downwardly relatively to said lifting head, and intermediate wheels on said elevating platform for contacting the ground when said elevating platform is lowered.

24. In a truck of the class described, a wheel supported lifting head, an elevating platform, means mounting the forward end of said platform for lifting movement relatively to said lifting head, wheel supporting links pivotally mounted under the rear of said elevating platform and adapted when moved to lift the rear of said platform, lifting means for lifting the forward end of said platform relatively to said lifting head, a rod pivoted at one end to said lifting head and at its other end relatively to one end of a second rod, means pivoting the other end of said second rod relatively to said wheel supporting links, means secured to said elevating platform for pivotally moving said rods relatively to each other and the lifting head and elevating platform as the front end of said elevating platform is lifted whereby to move said wheel supporting links to lift the rear of the elevating platform, said rods holding said lifting wheels upwardly off the ground when said platform is lowered relatively to said lifting head, springs pressing said elevating platform downwardly relatively to said lifting head, and intermediate wheels on said elevating platform for contacting the ground when said elevating platform is lowered.

25. In a truck of the class described, a wheel supported lifting head, an elevating platform, links pivotally mounting the forward end of said platform for lifting movement relatively to said lifting head, wheel supporting links pivotally mounted under the rear of said elevating platform and adapted when moved to lift the rear of said platform, intermediate wheels on said elevating platform adapted to contact the ground when said elevating platform is lowered relatively to said lifting head, lifting means for lifting the forward end of said platform relatively to said lifting head, a rod pivoted at one end to said lifting head and at its other end relatively to one end of a second rod, means pivoting the other end of said second rod relatively to said wheel supporting links, and means secured to said elevating platform for pivotally moving said rods relatively to each other and the lifting head and elevating platform as the front end of said elevating platform is lifted whereby to move said wheel supporting links to lift the rear end of the elevating platform, said means holding said lifting wheels upwardly off the ground with the lowermost portions of the peripheries thereof above the plane of corresponding portions of said intermediate wheels when said platform is lowered relatively to said lifting head.

26. In a truck of the class described, a wheel supported lifting head, an elevating platform, links pivotally mounting the forward end of said platform for lifting movement relatively to said lifting head, wheel supporting links pivotally mounted under the rear of said elevating platform and adapted when moved to lift the rear of said platform, lifting means for lifting the forward end of said platform relatively to said lifting head, a rod pivoted at one end to said lifting head and at its other end relatively to one end of a second rod, means pivoting the other end of said second rod relatively to said wheel supporting links, means secured to said elevating platform for pivotally moving said rods relatively to each other and the lifting head and elevating platform as the front end of said elevating platform is lifted whereby to move said wheel supporting links to lift the rear end of the elevating platform, springs pressing said elevating platform downwardly relatively to said lifting head, and intermediate wheels on said elevating platform for contacting the ground when said elevating platform is lowered.

27. In a truck of the class described, a wheel supported lifting head, an elevating platform, links pivotally mounting the front end of said elevating platform for lifting movement relatively to said lifting head, lifting means for lifting the forward end of said elevating platform relatively to said lifting head, intermediate wheels mounted for rotation on said elevating platform and positioned against the ground when said elevating platform is in its lowered position relatively to said lifting head, spring means for pressing said elevating platform into said lowered position relatively to said lifting head, lifting wheels movably mounted under the rear of said elevating platform, means for moving said lifting wheels downwardly as lifting of said platform is effected by said lifting means whereby to lift also the rear of said truck, and means holding said lifting wheels upwardly away from the ground with the lowermost portions of the peripheries thereof above the plane of corresponding portions of said intermediate wheels when said elevating platform is in its fully lowered position and with said intermediate wheels on the ground.

28. In a truck of the class described, a wheel supported lifting head, an elevating platform, links pivotally mounting the front end of said elevating platform for lifting movement relatively to said lifting head, lifting means for lifting the forward end of said elevating platform relatively to said lifting head, intermediate wheels mounted for rotation on said elevating platform and positioned against the ground when said elevating platform is in its lowered position relatively to said lifting head, spring means for pressing said elevating platform into said lowered position relatively to said lifting head, lifting wheels movably mounted under the rear of said elevating platform, actuating means for moving said lifting wheels downwardly as lifting of said platform is effected by said lifting means whereby to lift also the rear of said truck, and means whereby when said elevating platform is lowered relatively to said lifting head said actuating means are held in a position corresponding to a position of said lifting wheels off the ground and with the lowermost portions of the peripheries thereof above the plane of corresponding portions of said intermediate wheels.

29. In a truck of the class described, a wheel supported lifting head, an elevating platform, means mounting the forward end of said platform for lifting movement relatively to said lifting head, lifting wheels movably mounted under the rear of said elevating platform and adapted when moved to lift the rear of said platform, lifting means for lifting said platform relatively to said lifting head, a flexible connector secured at one end to said lifting head and at its other end relatively to said lifting wheels, and means adapted to pull on said flexible connector intermediate of its length as said lifting means effects the lifting of said platform relatively to said lifting head whereby to move said lifting wheels to lift the rear end of said platform.

30. In a truck of the class described, a wheel supported lifting head, an elevating platform, means mounting the forward end of said platform for lifting movement relatively to said lifting head, lifting wheels movably mounted under the rear of said elevating platform and adapted when moved to lift the rear of said platform, lifting means for lifting said platform relatively to said lifting head, a flexible connector secured to said lifting wheels, and means movable with said elevating platform adapted to pull on said flexible connector at a point intermediate its length as said lifting means effects the lifting of said platform relatively to said lifting head whereby to move said lifting wheels to lift the rear end of said platform.

31. In a truck of the class described, a wheel supported lifting head, an elevating platform, means mounting the forward end of said platform for lifting movement relatively to said lifting head, lifting wheels movably mounted under the rear of said elevating platform and adapted when moved to lift the rear of said platform, lifting means for lifting said platform relatively to said lifting head, a flexible connector secured at one end to said lifting head and at its other end relatively to said lifting wheels, and means on said elevating platform adapted to pull on said flexible connector at a point intermediate its length as said lifting means effects the lifting of said platform relatively to said lifting head whereby to move said lifting wheels to lift the rear end of said platform.

32. In a truck of the class described, a wheel supported lifting head, an elevating platform, means mounting the forward end of said platform for lifting movement relatively to said lifting head, lifting wheels movably mounted under the rear of said elevating platform and adapted when moved to lift the rear of said platform, lifting means for lifting the forward end of said platform relatively to said lifting head, a rod pivoted at one end to said lifting head and at its other end relatively to one end of a second rod, means pivoting the other end of said second rod relatively to said wheel supporting means, and a rod pivoted to said elevating platform and relatively to said first and second rods for pivotally moving said first and second rods relatively to each other and the lifting head and elevating platform as the front end of said elevating platform is lifted whereby to move said lifting wheels to lift the rear end of the elevating platform.

33. In a truck of the class described, a wheel supported lifting head, an elevating platform, means mounting the forward end of said platform for lifting movement relatively to said lifting head, lifting wheels movably mounted under the rear of said elevating platform and adapted when moved to lift the rear of said platform, lifting means for lifting the forward end of said platform relatively to said lifting head, a cable secured at one end to said lifting head and at its other end relatively to said wheel supporting means, and a roller secured for movement with said elevating platform and adapted to pull on said cable as the forward end of said platform is lifted whereby to move said wheel supporting means to lift the rear end of said platform.

34. In a truck of the class described, a wheel supported lifting head, an elevating platform, upper and lower parallel links pivotally mounting the forward end of said platform for lifting movement relatively to said lifting head, wheel supporting links pivotally mounted under the rear of said elevating platform and adapted when moved to lift the rear of said platform, lifting means for lifting the forward end of said platform relatively to said lifting head, a rod pivoted at one end to said lifting head, a second rod pivoted relatively to said wheel supporting links, a third rod independent of said parallel links pivoted at one end to said elevating platform, and means pivoting the other end of said third rod relatively to said first two rods for pivotally moving said first two rods relatively to each other and the lifting head and elevating platform as the front end of said elevating platform is lifted whereby to move said wheel supporting links to lift the rear end of the elevating platform.

35. In a truck of the class described, a wheel supported lifting head, an elevating platform, upper and lower parallel links pivoted at one end to said lifting head and extending angularly downwardly and pivoted to said elevating platform for mounting said platform for rearward and upward movement relatively to said lifting head, wheel supporting links pivotally mounted under the rear end of said platform, lifting means for lifting the forward end of said platform relatively to said lifting head on said parallel links, a rod pivoted to said lifting head, a second rod pivoted to said wheel supporting links, means pivotally inter-connecting said rods, and means on said elevating platform adapted to move said rods on their pivots as the forward end of said platform is lifted whereby to move said wheel supporting means to lift the rear end of the platform.

36. In a truck of the class described, a wheel supported lifting head, an elevating platform, means mounting the forward end of said platform for lifting movement relatively to said lifting head, intermediate wheels on said elevating platform adapted to contact the ground when said elevating platform is lowered relatively to said lifting head, lifting wheels movably mounted under the rear of said elevating platform and adapted when moved to lift the rear of said platform, lifting means for lifting the forward end of said platform relatively to said lifting head, a leverage system including a lever pivoted to said lifting head, a second lever pivoted to said lifting wheel mounting and pivotally connected to said first lever, and means secured to said elevating platform for actuating said leverage system as the forward end of said platform is lifted whereby to move said lifting wheels to lift the rear end of the platform, said leverage system holding said lifting wheels upwardly off the ground with the lowermost portions of the peripheries thereof above the plane of corresponding portions of said intermediate wheels when said platform is lowered relatively to said lifting head.

37. In a truck of the class described, a wheel supported lifting head, an elevating platform, means mounting the forward end of said platform for lifting movement relatively to said lifting head, lifting wheels movably mounted under the rear end of said elevating platform and adapted when moved to lift the rear of said platform, lifting means for lifting the forward end of said platform relatively to said lifting head, a non-rigid mechanical connection between said lifting head and said lifting wheels for moving said wheels positively downwardly and upwardly by the deforming of said connection, means adapted to deform said non-rigid connection as said elevating platform is lifted by said lifting means and thereafter lowered, and intermediate wheels on said elevating platform adapted to contact the ground when said elevating platform is lowered, said non-rigid mechanical connection holding said lifting wheels off the ground with the lowermost portions of the peripheries thereof above the plane of corresponding portions of said intermediate wheels when said elevating platform is lowered.

38. In a truck of the class described, a lifting head, an elevating platform, parallel links pivotally mounting said elevating platform for lifting movement relatively to said lifting head, support wheels on which said truck is adapted for movement when said elevating platform is in its lowered position relatively to said lifting head, lifting wheels, means mounting said lifting wheels for movement bodily relatively to said platform and for lifting said platform when said wheels are lowered relatively to said platform, said mounting means maintaining said lifting wheels with the lowermost portions of the peripheries thereof above the plane of corresponding portions of said support wheels when said elevating platform is in its lowered position, and lifting means for effecting the movement of said lifting wheels relatively to said elevating platform.

39. In a truck of the class described, a lifting head, an elevating platform, parallel links pivotally mounting said elevating platform for lifting movement relatively to said lifting head, support wheels on which said truck is adapted for movement when said elevating platform is in its lowered position relatively to said lifting head, lifting wheels, means mounting said lifting wheels for movement bodily relatively to said platform and for lifting said platform when said wheels are lowered relatively to said platform, means whereby said mounting means are maintained with the lowermost portions of the peripheries of said lifting wheels above the plane of corresponding portions of said support wheels when said elevating platform is in its lowered position relatively to said lifting head, and lifting means for effecting the movement of said mounting means and lifting wheels relatively to said elevating platform.

40. In a truck of the class described, a wheel supported lifting head, an elevating platform, support wheels for said truck, means mounting said platform for lifting movement relatively to said lifting head, lifting means for lifting the forward end of said elevating platform relatively to said lifting head on said mounting means, lifting wheels for the rear of said elevating platform, wheel carrying means for supporting said lifting wheels and movably mounted under the rear of said elevating platform for lifting the rear of said platform when moved downwardly relatively thereto, means secured to said elevating platform for holding said wheel carrying means with the lifting wheels off the ground and with the lowermost portions of the peripheries thereof above the plane of corresponding portions of said support wheels when said elevating platform is lowered relatively to said lifting head, and said means effecting the lowering movement of said wheel carrying means to lower the said lifting wheels against the ground and to lift the rear of said platform when said platform is elevated by said lifting means.

41. In a truck of the class described, a lifting head, an elevating platform, links pivotally mounting the front end of said elevating platform for lifting movement on said lifting head with the said platform extending rearwardly from said mounting means and forming an overhanging platform portion spaced from the ground, at least one support wheel for said lifting head, support wheels mounted on said elevating platform and cooperating with said first support wheel to support said truck, and lifting means for lifting said elevating platform relatively to said lifting head whereby to lift also said platform support wheels, said lifting means including lifting wheels movably mounted on said elevating platform and means for moving said wheels from a position spaced from the ground and with the lowermost portions of the peripheries of said lifting wheels above the plane of corresponding portions of said support wheels to a position against the ground whereby to accept the weight of said elevating platform.

42. In a truck of the class described, a wheel supported lifting head, an elevating platform, means mounting the front end of said elevating platform for elevating movement on said lifting head and with the rear end of said platform held spaced from the ground when said platform is in its lowered position on said lifting head, support wheels mounted on the front end of said elevating platform and lying against the ground when said platform is fully lowered relatively to said lifting head, lifting means for lifting said platform relatively to said lifting head on said mounting means, lifting wheels for the rear of said platform, wheel carrying means for said wheels movably mounted on the rear of said platform, means of connection between said wheel carrying means and said elevating platform whereby when said elevating platform is moved to its lowered position it moves said wheel carrying means to a position with said lifting wheels off the ground and with the lowermost portions of the peripheries of said lifting wheels above the plane of corresponding portions of said support wheels, the lifting of said elevating platform acting through said means of connection to move said wheel carrying means to bring said wheels downwardy against the ground to lift the rear of said platform.

HERBERT J. FRAMHEIN.

REFERENCES CITED

The following references are of record in the file of this patent:

UNITED STATES PATENTS

| Number | Name | Date |
|---|---|---|
| 2,358,957 | Barrett | Sept. 26, 1944 |
| 2,274,164 | Quayle | Feb. 24, 1942 |
| 2,234,925 | Hastings | Mar. 11, 1941 |
| 1,630,619 | Kimber | May 31, 1927 |
| 1,416,675 | Barrett | May 23, 1922 |